United States Patent Office 3,318,928
Patented May 9, 1967

3,318,928
7α-ALKYL-17α-ALKINYL-ESTRADIOLS
Georg Anner and Jaroslav Kalvoda, Basel, and Peter Wieland, Oberwil, Basel-Land, Switzerland, assignors to Ciba Corporation, New York, N.Y., a corporation of Delaware
No Drawing. Filed Dec. 21, 1964, Ser. No. 420,185
Claims priority, application Switzerland, Dec. 24, 1963, 15,945/63; May 27, 1964, 6,914/64; Dec. 3, 1964, 15,655/64
2 Claims. (Cl. 260—397.5)

This invention relates to the manufacture of 7α-methyl-17α-ethinyl-estradiol of the formula (I)
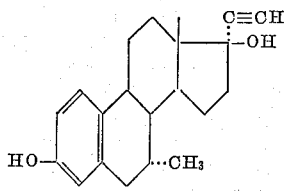

and its 3-methyl ether. These compounds have valuable pharmacological properties. Thus in the castrated female rat, the 7α-methyl-17α-ethinyl-estradiol, when administrated subcutaneously in the Allen-Doisy test (keratinization of the vagina), has eight times the estrogenic action of 17α-ethinyl-estradiol, and in the Bülbring-Burn test (growth of uterus), it has four times the estrogenic action of 17α-ethinyl-estradiol. On oral administration of 7α-methyl-17α-ethinyl-estradiol through a stomach tube to the castrated female rat in the Allen-Doisy test, a three times higher intensity of the estrogenic effect is observed than with 17α-ethinyl-estradiol. The new compounds can therefore be used as highly active estrogens.

The new compounds can be prepared in per se conventional manner, especially by aromatization of the ring A in a compound of the formula (II)
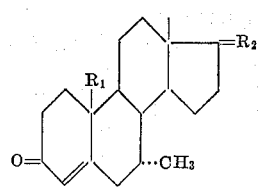

in which $R_1$ represents hydrogen, a free or esterified hydroxyl group or a methyl or hydroxymethyl group, and $R_2$ in the group

or a substituent convertible thereinto, e.g. an oxygenated substituent, e.g. a free or functionally converted hydroxy group together with a hydrogen atom, or a free or functionally converted oxo group, and which compounds may contain another double bond in 1,2-position, and, if desired, by conversion into the group

of a substituent that is so convertible, and/or by conversion of the 3-hydroxy group into the methoxy group. Thus, for example a 19-unsubstituted $\Delta^{1,4}$-3-oxo-7α-methyl-androstadiene of the above Formula II can be aromatized in ring A by pyrolysis. To this end, said starting material is heated in the presence or absence of a solvent or diluent, e.g., a mineral oil or a cyclic hydrocarbon, such as 9,10-dihydro-phenanthrene, for example to 200–600° C. Another method of aromatization consists in treating said 19-unsubstituted $\Delta^{1,4}$-3-oxo-7α-methyl-androstadiene with lithium and diphenyl in the presence of diphenyl methane as described in Journal of American Chemical Society, 86, 742 (1964). Tetrahydrofuran is the preferred solvent used.

After aromatization, a substituent convertible into the group

is so converted in per se conventional manner, e.g. as described below, and/or, if desired, the 3-hydroxy group is converted into a methoxy group, likewise in per se conventional manner.

The new compounds can also be obtained by pyrolysis of a $\Delta^4$-3-oxo-7α-methyl-10-acyloxy-19-nor-androstene of the above Formula II and, if necessary, conversion of the 17-substituent into the group

and/or of the 3-hydroxy group into the methoxy group. In these starting materials, the acyloxy group is especially the acyloxy group of a carboxylic acid, e.g. of a lower aliphatic or aromatic carboxylic acid, e.g. acetic, trifluoracetic or benzoic acid. According to this method, the 10-acyloxy group is eliminated by heating the starting material, advantageously to a temperature above 80° C., preferably under reduced pressure, or by heating it for a short while in a high-boiling solvent or diluent, especially a hydrocarbon or ether, such as toluene, xylene, Tetralin, Decalin, dioxane, anisol or diethylene glycol dimethyl ether.

The new compounds can also be obtained by treating a $\Delta^{1,4}$ - 3 - oxo-7α-methyl-19-hydroxy-androstadiene of the above Formula II with an acid or a base, and, if desired, converting the substituent in 17-position into the group

and/or the 3-hydroxy group into a methoxy group. As acids there are advantageously used mineral acids, such as hydrochloric acid, sulfuric acid or chlorosulfonic acid, or carboxylic acids, such as formic, acetic, or propionic acid, and as bases, e.g. alkali metal hydroxides, such as sodium or potassium hydroxide, or nitrogen bases, such as pyridine or dimethyl formamide. If one of the acid or basic agents mentioned is used that does not dissolve the starting material, the reaction is advantageously performed in a solvent, for example in a hydrocarbon, alcohol, ether or ketone, such as benzene, xylene, methanol, ethanol, dioxane or acetone.

Starting from a compound of the above Formula II in which $R_1$ represents a hydrogen atom, the new compounds can be prepared by treating with a dehydrogenating agent, preferably one that is capable of introducing double bonds in positions 1,2 or 1,2 and 4,5 or 10-methylsteroids, followed by conversion, if desired, of a substituent in 17-position into the grouping

and/or of the free hydroxyl group in 3-position into a 3-methoxy group. To the said dehydrogenating agents belong quinones, especially 2,3-dichloro-5,6-dicyano-benzoquinone or chloranil, or selenious acid and its derivatives such as selenium dioxide or dibenzoyloxy selenium oxide. This dehydrogenation is performed in the usual manner, for example in a solvent, advantageously in an ether or alcohol, such as diethyl ether, dioxane, tetrahydrofuran, ethanol or tertiary butanol, and advantageously at an elevated temperature. Alternatively, the said starting compounds may be treated with microorganisms capable of introducing a double bond in the 1,2-position of a steroid, e.g. with *Corynebacterium simplex, Didymella lycopersici, Bacillus subtilis* or *Septomyxa affinis*. If necessary, this treatment is followed by conversion of the 17-substituent as said above or of the 3-hydroxyl group into a methoxy group according to known methods.

Another method of producing the new compounds of this invention consists in causing an acid to act on a $\Delta^4$-3-oxo-6$\beta$-halogen-7$a$-methyl-19-nor-androstene of the formula (III)

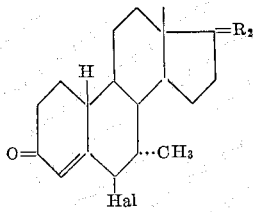

in which $R_2$ has the meaning given above, and Hal stands for halogen, especially bromine, and if desired or required converting the 17-substituent into the group

and/or the 3-hydroxy group into a 3-methoxy group. It is of advantage to use strong acids, especially mineral acids, e.g. those mentioned above. This reaction can be performed in one of the aforementioned solvents. Particularly favorable results are obtained when the reaction is performed with hydrochloric acid in acetone.

Furthermore, the new compounds can be prepared from a $\Delta^{1,4,9(11)}$-3-oxo-7$a$-methyl-androstatriene of the formula (IV)

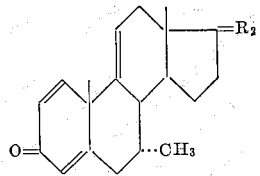

in which $R_2$ has the meaning given above, by treatment with zinc and hydrogenation of the $\Delta^{1,3,5(10)9(11)}$-3-hydroxy-7$a$-methyl-estratetraene formed and, if desired, conversion of the 17-substituent into the group

and/or the 3-hydroxy group into the 3-methoxy group. Alternatively, hydrogenation may follow the last-mentioned conversions. The treatment with zinc is advantageously performed in aqueous pyridine, e.g. pyridine water (9:1) or an alkanol or glycol such as ethanol or ethylene glycol. For the hydrogenation it is of advantage to use catalytically activated or nascent hydrogen, e.g. hydrogen and palladium catalysts or sodium or potassium in liquid ammonia.

Finally, the new compounds can also be prepared by the following new method which permits of the stereospecific introduction of the 7$a$-methyl group. It consists in reacting the 6,7$\beta$-epoxide of a 3,17-dioxygenated $\Delta^{1,3,5(10)}$-estratriene of the formula (V)

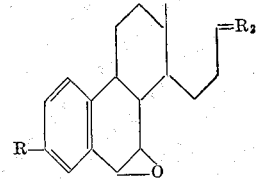

in which R represents a free or functionally converted, e.g. esterified or etherified, hydroxy group, and $R_2$ has the meaning given above, with a methyl metal compound, e.g. a methyl magnesium halide, especially methyl magnesium bromide or iodide, or with lithium methyl, eliminating the hydroxy group from the resulting 6-hydroxy-7$\alpha$-methyl compound, if desired after esterification of the latter, and, if desired, converting the group in 17-position into the group

and/or a free or functionally converted 3-hydroxy group into a methoxy group or into a free hydroxy group. This reaction with the methyl magnesium halide is advantageously performed in an ether, such as diethyl ether, tetrahydrofuran or dioxan, or an aromatic hydrocarbon, such as benzene. The hydrogenolytic elimination of the hydroxy group from the 6-hydroxy-7$\alpha$-methyl compound is advantageously performed with catalytically activated or nascent hydrogen. The 6-hydroxy group may also be esterified, for example with a reactive, functional derivative of a carboxylic or sulfonic acid, e.g. one of those mentioned above, and then split off hydrogenolytically, e.g. with Raney nickel.

A substituent, e.g. an oxygenated substituent, present in 17-position and convertible into the group

is, for example, a free or functionally converted hydroxy or oxo group. A functionally converted hydroxy group in 3- or 17-position is, for example, a hydroxy group esterified with a carboxylic acid, e.g. one having at most 20 carbon atoms, e.g. formic, acetic, propionic, butyric, valeric, caproic, trimethylacetic, undecylenic, cyclopropylcarboxylic, cyclopentylcarboxylic, cyclohexylacetic, phenylaetic, phenylpropionic, phenoxyacetic, acetoacetic, diethylaminoacetic, glycolic, bisglycolic, asparaginic, benzoic, ortho-sulfobenzoic, furan-2-carboxylic, or nicotinic acid, or methane, ethane, benzene, or toluene sulfonic acid, or a hydroxy group etherified with a lower aliphatic alcohol, such as methyl or ethyl alcohol, an araliphatic alcohol, such as benzyl alcohol, or a heterocyclic alkanol, such as tetrahydropyranol; a functionally converted oxo group is, for example, a ketalized oxo group, an oxime or hydrazone group.

The conversion of a 17-oxygenated substituent into the group

in all of the above methods follows the known pattern. Thus, an esterified or etherified hydroxy group in 17-position can be split, e.g. hydrolytically or hydrogenolytically, and a free 17-hydroxy group so obtained can be converted into the oxo group in known manner, if desired, after functional conversion of a free 3-hydroxy group. For this dehydrogenation there are used, for example, derivatives of hexavalent chromium, e.g. chromic acid, or the Oppenauer method is employed with an aluminum alcoholate in the presence of a ketone in solution in benzene. A ketalized oxo group can be liberated, for example, by acid hydrolysis. In a resulting 17-oxo compound, the ethinyl radical can be introduced in known manner by means of a metal compound of acetylene, if desired, after prior conversion of a 3-hydroxy group into an ether or ester group. For example acetylene is caused to act in the presence of an alcoholate, e.g. a lower alkali metal alkanolate, such as sodiummethylate or sodium tertiary amylate, on the 17-oxo compound dissolved in a lower alkanol, such as ethanol, butanol or tertiary pentanol, or in an ether, such as glycol-dimethyl ether. Alternatively, the 17-ketone may be treated with lithium acetylide, e.g. in toluene containing some dimethyl sulfoxide.

The greater part of the starting materials are known. New starting materials can be prepared by known methods. The $\Delta^4$-3-oxo-7$\alpha$-methyl compounds of the androstane or 19-nor-androstane series of the above Formulae II, III and IV, for example, can be prepared from the corresponding 7-unsubstituted $\Delta^{4,6}$-3-oxo-androstadienes or -19-nor-androstadienes by treatment with methyl magnesium iodide in the presence of copper-I-chloride or copper-II-acetate, followed by hydrolysis. The resulting products can be dehydrogenated in 1,2-position with selenium dioxide or quinones, especially 2,3-dichloro-5,6-dicyanobenzoquinone, in alcohols, such as tertiary butanol or tertiary pentanol, or with enzymes of fungi of the genus Fusarium, Didymella, Corynebacterium or *Bacillus subtilis* or *sphaericus*, or they can be hydroxylated in 19-position, if desired, before or after dehydrogenation, with enzymes of fungi of the genus Corticium or Pericularia. $\Delta^4$-3-oxo-7$\alpha$-methyl-10-acyloxy-19-nor-androstenes can be prepared by reacting $\Delta^4$-3-oxo-7$\alpha$-methyl-19-hydroxy-androstenes with lead tetraacylates, especially lead tetraacetate, in nonpolar solvents, such as benzene or cyclohexane. $\Delta^4$-3-oxo-6$\beta$-halogen-7$\alpha$-methyl-19-nor-androstenes can be obtained from 3-enol ethers of said $\Delta^4$-3-oxo-7$\alpha$-methyl-19-nor-androstenes by reacting them with N-halogencarboxylic acid amides or imides, such as N-bromo-acetamide or N-bromo-succinimide.

The 6,7$\beta$-eoxides of the Formula V used in the new process can be obtained from the corresponding $\Delta^{1,3,5(10),6}$-estratetraenes by reaction with N-halogen-carboxylic acid amides or imides, e.g. those mentioned above, and treatment of the resulting 6,7-halohydrins with alkalis, advantageously with potassium hydroxide in aqueous dioxane. Any oxo groups present in the starting materials may, if deired, be ketalized in known manner, for example, with lower alkanols or glycols, such as methanol or ethylene glycol.

The new compounds can be used as medicaments in the form of pharmaceutical preparations containing them in admixture or conjunction with a phamaceutical, organic or inorganic, solid or liquid carrier suitable for enteral, e.g. oral, or parenteral administration. Suitable carriers are substances that do not react with the new compounds, for example, water, gelatine, lactose, starches, magnesium stearate, talcum, vegetable oils, benzyl alcohols, gums, polyalkylene glycols, cholesterol or other known medicinal carriers. The pharmaceutical preparations may be, for example, tablets, dragées or capsules, or in liquid form solutions, suspensions or emulsions. They may be sterilized and/or may contain assistants, such as preserving, stabilizing, wetting or emulsifying agents, salts for regulating the osmotic pressure or buffers. They may additionally contain other therapeutically valuable substances.

In these pharmaceutical preparations the amount of the active estrogenic substance is preferably within the dose range of 0.002 mg. and 0.015 mg. per unit dose.

The following examples illustrate the invention.

EXAMPLE 1

A solution of 500 mg. of crude 7$\alpha$-methylestrone-3-tetrahydropyranyl ether in 40 ml. of ether and 3 ml. of toluene is saturated with acetylene gas at 0° C. and 10 ml. of a 1.8 N-solution of sodium tertiary amylate in tertiary amyl alcohol are dropped in within 20 minutes at $-10$ to 0° C. A weak current of acetylene gas is then passed through for 15 hours at 0 to 3° C. The reaction mixture is poured into 70 ml. of a 20% ammonium chloride solution which has previously been cooled to $-5°$ C., the batch is stirred for a short time in a separating funnel, and the aqueous phase is separated and extracted with ether. The organic solutions are washed with ice-cold ammonium chloride solution, and then dried with sodium sulfate. On removal of the solvents in a water-jet vacuum there are obtained 550 mg. of crude, amorphous 7$\alpha$-methyl - 17$\alpha$ - ethinyl-estradiol-3-tetrahydropyranyl ether which, on hydrolysis with dilute acetic acid, furnishes $\Delta^{1,3,5(10)}$-3,17$\beta$-dihydroxy-7$\alpha$-methyl-17$\alpha$ - ethinyl-estratriene. The ultraviolet spectrum of the compound contains bands, inter alia, at 2.83, 3.00 (4.52), 6.20, 6.31, m$\mu$ ($\epsilon$=2500). The infrared spectrum in Nujol contains bands, inter alio, at 2.83, 3.00 (4.52), 6.20, 6.31, 6.67 and 9.60$\mu$.

EXAMPLE 2

0.2 ml. of a solution of 0.25 ml. of concentrated sulfuric acid in 5 ml. of dioxane is added to a solution of 500 mg. of $\Delta^4$-3-oxo-7$\alpha$-methyl-17$\beta$-acetoxy-19-norandrostene in 4 ml. of absolute dioxane, 0.8 ml. of orthoformic acid ethyl ester and 0.04 ml. of absolute ethanol, and the whole is stirred for 20 minutes at 20° C. 0.5 ml. of pyridine is then added and the solution is evaporated under a water-jet and a high vacuum; the residue is mixed with water and ether, and the organic layer is once more washed with water, dried and evaporated under a water-jet vacuum, to yield 590 mg. of a yellow oil which, on chromatography on neutral alumina (activity II), yields 303 mg. of crystalline $\Delta^{3,5}$-3-ethoxy-7$\alpha$-methyl-17$\beta$-acetoxy-19-norandrostadiene. The infrared spectrum of this compound contains, inter alia, bands at 5.80, 6.00, 6.15, 8.03, 8.10, 9.60 and 9.75$\mu$. It is dissolved without previous purification in 10 ml. of acetone, mixed with a solution of 180 mg. of sodium acetate in 1.3 ml. of water, cooled to about $-15°$ C., 255 mg. of N-bromosuccinimide and 0.2 ml. of glacial acetic acid are added, and the batch is stirred for 2 hours at $-15°$ to $-20°$ C. A solution of 300 mg. of potassium iodide in 1.5 ml. of water and then 400 mg. of sodium thiosulfate in 2 ml. of water are added, the mixture is diluted with ether, the organic layer is washed with water, dried and evaporated under a water-jet vacuum. The resulting crude $\Delta^4$-3-oxo-6-bromo-17$\beta$-acetoxy-19-norandrostene is dissolved in 5 ml. of acetone, mixed with 2 drops of concentrated hydrochloric acid and refluxed for 2 hours. Conventional working up yields amorphous 7$\alpha$-methyl-estradiol-17-acetate whose infrared spectrum contains bands, inter alia, at 2.82, 5.80, 6.20 (6.32), 6.68, 8.07, 9.60 and 9.75$\mu$.

1.7 g. of the compound so obtained are dissolved in a mixture of 4 ml. of dihydropyran and 4 ml. of tetrahydrofuran. 0.1 ml. of phosphorus oxychloride is added to the solution, which is then left to itself for 15 minutes with exclusion of moisture. The reaction solution is then poured on to 100 ml. of ice+water and 35 ml. of saturated sodium bicarbonate solution, and the mixture is extracted with ether. The organic layer is washed neutral with water, dried, and evaporated under a water-jet vacuum. The resulting colorless oil (2.10 g.) is then dissolved in methylene chloride and filtered through 30 times its weight of alumina (activity I). In the IR spectrum, the resulting $\Delta^{1,3,5(10)}$-3-tetrahydropyranyloxy-7$\alpha$-methyl-17$\beta$-acetoxy-estratriene (1.76 g.) exhibits bands as 5.78, 6.23, 6.71, 8.20, 9.00, 9.74, 9.85 and 10.40$\mu$. It is hydrolyzed without being first purified. To this end, it is dissolved in 100 ml. of methanol, and a solution of 2.94 g. of potassium carbonate in 10 ml. of water added, the mixture then stirred, and boiled for 15 hours under reflux. The reaction mixture is then cooled, poured into 350 ml. of water while stirring vigorously, the crystalline crude product is filtered off with suction, washed with water, dissolved in ether, and the solution shaken once with water, dried, admixed with 3 to 5 drops of pyridine, and evaporated under a water-jet vacuum. The resulting crude, crystalline $\Delta^{1,3,5(10)}$-3-tetrahydropyranyloxy-7α-methyl-17β-hydroxy-estratriene (1.52 g.) is dissolved in 15 ml. of acetone, the solution cooled to 0° C., treated, while being stirred and cooled, with 1.3 ml. of an 8 N-chromic acid solution in dilute sulfuric acid and, after about 1 minute, with 3 g. of sodium acetate. The reaction mixture is then diluted with water and ether, the aqueous layer separated, and extracted with ether. The organic solution is washed neutral with ice-cold sodium bicarbonate solution and water, dried, and evaporated under a water-jet vacuum. The resulting crude product yields on recrystallization from methylene chloride+ether and chromatography of the mother liquors a total of 1.10 g. of pure 7α-methyl-estrone-3-tetrahydropyranyl ether of melting point 157–159° C. (IR spectrum: bands, inter alia, at 5.78, 6.24, 6.72, 8.36, 8.93, 9.35, 9.66 and 10.34μ.)

A solution of the afore-described tetrahydropyranyl ether of 7α-methyl-estrone (550 mg.) in 8 ml. of dimethyl sulfoxide is added to a stirred suspension of 1.0 g. of lithium acetylide-ethylene diamine complex in 4 ml. of absolute toluene and 5.0 ml. of dimethyl sulfoxide, and the mixture stirred for another 4 hours under nitrogen. After the careful addition of 2.0 g. of solid ammonium chloride and 10 ml. of water, the reaction mixture is extracted with ether. The ethereal extracts are dried, washed neutral, and evaporated under a water-jet vacuum. They yield 580 mg. of crude product from which by chromatography on silica gel (+15% water) and subsequent crystallization of the benzene+ethyl acetate (95:5) eluates 320 mg. of pure $\Delta^{1,3,5(10)}$-3-tetrahydropyranyloxy - 7α - methyl - 17α - ethinyl - 17β - hydroxyestratriene are obtained. (IR spectrum: bands inter alia at 2.85, 3.10, 6.24, 6.72, 9.66, 9.80 and 10.33μ.) 300 mg. of this compound, on heating of their suspension in 10 ml. of 70% acetic acid to 60° C. for 12 minutes, working up in the usual manner, and recrystallization of the crude product obtained from ether+petroleum ether, yield: 183 mg. of pure 7α-methyl-17α-ethinyl-estradiol of melting point 120° C. (decomposition by elimination of crystal ether); $[α]_D^{20}=-3.0°±2°$ (C.=0.850).

EXAMPLE 3

To a solution of 250 mg. of lithium in a mixture of 4.6 g. of diphenyl and 25 ml. of tetrahydrofuran are added 0.55 ml. of diphenylmethane and 1 g. of 3-oxo-7α-methyl-17-ethylenedioxy-$\Delta^{1,4}$,androstadiene, which are rinsed in with 5 ml. of tetrahydrofuran. The mixture is boiled and stirred for 2 hours under a current of nitrogen, then cooled with a mixture of ice and methanol, and treated with 2.5 g. of ammonium chloride. The solution discolors. 10 minutes later, it is treated with 7.5 ml. of water and with benzene. It is then washed with a dilute solution of sodium chloride, extracted with benzene, dried, and evaporated under vacuum. The residue is treated with 30 ml. of 90% acetic acid and the flask filled with nitrogen and heated from 60° to 80° C. in the course of 25 minutes. The batch is then evaporated under reduced pressure, and this operation repeated once with benzene. The residue is chromatographed over 30 g. of alumina (activity II). The 7α-methyl-estrone is eluted with benzene. Recrystallization from a mixture of methylene chloride and ether results in 350 mg. of the product. It melts at 233 to 236° C. and its mixed melting point with authentic material shows no lowering, and the IR spectrum is identical with that of authentic material.

A solution of 7α-methyl-estrone (500 mg.) in 15 ml. of dimethylsulfoxide and 5 ml. of toluene is added to a stirred suspension of 1.5 g. of lithium acetylideethylenediamine complex in 5 ml. of absolute toluene and 10.0 ml. of dimethylsulfoxide added. The mixture is stirred for another 4 hours under nitrogen. After the careful addition of 2.0 g. of solid ammonium chloride and 10 ml. of water, the reaction mixture is extracted with a 4:1 mixture of ether and methylene chloride. The extracts are dried, washed neutral, and evaporated under a water-jet vacuum, and yield 480 mg. of a crude product from which 215 mg. of pure 7α-methyl-17α-ethinyl-estradiol of melting point 120° C. (decomposition by elimination of crystal ether) are obtained on chromatography on silica gel (+15% water) followed by crystallization of the 9:1 benzene-ethyl acetate eluates from ether+petroleum ether.

EXAMPLE 4

To a suspension, stirred under nitrogen, of 1.30 g. of lithium acetylide-alkylenediamine complex in 5.0 ml. of toluene and 6.0 ml. of dimethylsulfoxide is added dropwise a solution of 650 mg. of 7α-methyl-estrone-3-methyl ether in 10.0 ml. of toluene. 10 ml. of dimethyl sulfoxide are then added, and the mixture stirred for 1 hour at 20° C. The reaction mixture is then cooled to about 5° C., carefully treated with 2.5 g. of ammonium chloride and 14 ml. of water while cooling, then diluted with a 4:1 mixture of ether and methylene chloride, the aqueous layer separated and extracted with ether, the organic layer washed in turn with saturated ammonium chloride solution and with water, dried, and evaporated under a water-jet vacuum. According to the IR spectrum and the thin-layer chromatogram (4:1 benzene+ethyl acetate), the amorphous evaporation residue (650 mg.) still contains about 15% of starting material and is purified by chromatography over 40 times its weight of neutral aluminum oxide (activity II). The benzene fractions are combined and recrystallized from methylene chloride+ether+petroleum ether to yield 416 mg. of pure $\Delta^{1,3,5(10)}$-3-methoxy-7α-methyl-17α-ethinyl-17β-hydroxy-estratriene melting at 111 to 112° C. IR spectrum: bands, inter alia, at 2.77, 3.01, 6.20, 6.34, 6.65, 8.10 and 9.62μ; $[α]_D^{20}=0°±2°$ (c.=0.532%).

The starting material is prepared thus:

To a suspension, cooled to −10° C. of 2.5 g. of 7α-methylestrone in 12 ml. of methanol and 8.5 ml. of methylene chloride is added, while stirring, in the course of 30 minutes, a solution of 1.50 g. of sodium hydroxide in 3.0 ml. of water. In the course of another 90 minutes 3.60 ml. of dimethyl sulfate are added dropwise to the reaction solution. The mixture is then treated with a solution of 1.80 g. of sodium hydroxide in 4 ml. of water, and then, in the course of 30 minutes with another 3.0 ml. of dimethyl sulfate. The methylene chloride is then evaporated off under a water-jet vacuum, water is added to the concentrated reaction mixture, which is then cooled. The product that precipitates is filtered off, washed with water, then dissolved in a 4:1 mixture of ether and methylene chloride, the solution washed neutral with water, dried and evaporated under a water-jet vacuum. 2.5 g. of the crude 3-methyl ether of 7α-methyl-estrone (melting at 151 to 152° C. are obtained. By recrystallization from methylene chloride+methanol, a preparation melting at 161 to 162° C. is obtained. IR spectrum: bands inter alia at 5.74, 6.20, 6.29, 6.65, 8.10, 8.30, 9.30 and 9.48μ; $[α]_D^{16}=+144°±2$ (c.=0.477%).

EXAMPLE 5

*Pharmaceutical preparations containing 7α-methyl-17α-ethinyl-estradiol*

(a) A tablet containing 0.003 mg. 7α-methyl-17α-ethinyl-estradiol to be used as estrogenic preparation

| Ingredients: | Mg. |
|---|---|
| 7α-methyl-17α-ethinyl-estradiol | 0.004 |
| Lactose | 60.00 |
| Wheat starch | 20.00 |
| Colloidal silicic acid with hydrolysed starch | 5.00 |
| Talc | 5.00 |
| Magnesium stearate | 0.50 |
| Arrowroot | 9.497 |
| | 100.00 |

(b) A tablet containing 0.015 mg. of the 7α-methyl-17α-ethinyl-estradiol-3-methyl-ethyl to be used as estrogenic preparation Ingredients:                                           Mg.
    7α-methyl-17α-ethinyl-estradiol-3-methyl
      ether _____ 0.015
    Lactose _____ 50.00
    Wheat starch _____ 30.00
    Gelatine _____ 1.00
    Talc _____ 5.00
    Magnesium stearate _____ 0.50
    Arrowroot _____ 13.485
                                                             100.00

*Preparation.*—The mixture of the active ingredients, lactose and wheat starch is moistened with a solution containing the colloidal silicic acid or the gelatine to form a slightly plastic mass and then granulated in the usual manner. After being dried at 40° the mass is brought into the usual grain size by being passed through a sieve. Arrowroot, magnesium stearate and talc are added to the dried mass and the mixture is then compressed into tablets of 7 mm. diameter.

(c) 1000 linguettes each containing 0.003 mg. 7α-methyl-17α-ethinyl-estradiol.

Ingredients:                                            G.
    7α-methyl-17α-ethinyl-estradiol _____ 0.003
    Lactose _____ 100.00
    Saccharose _____ 229.997
    Stearic acid _____ 3.00
    Talc _____ 17.00
                                                             350.00

*Procedure.*—The mixture of the active substance with lactose is moistened with an aqueous solution of saccharose and granulated in the usual manner. After being dried, the sieved granulate is mixed with stearic acid and talc and then compressed into linguettes.

(d) 100 oil ampoules each containing 0.005 mg. of 7α-methyl-17α-ethinyl-estradiol.

Ingredients:
    7α-methyl-17α-ethinyl-estradiol _____g.___ 0.0005
    Benzyl alcohol _____ml.___ 10.00
    Sesame oil, ad. 100 ml.

*Procedure.*—The active ingredient is dissolved in benzyl alcohol and the stirred solution diluted with hot sterilized sesame oil. 1 ml. of this solution containing the ingredients in the above amounts is filled in ampoules which are sterilized at 160° C. for 1.5 hours.

What is claimed is:
1. The 7α-methyl-17α-ethinyl-estradiol of the formula

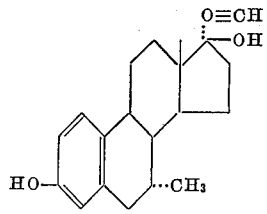

2. The 3-methyl ether of 7α-methyl-17α-ethinyl-estradiol.

References Cited by the Examiner

FOREIGN PATENTS 723,697   2/1955   Great Britain.

OTHER REFERENCES

Campbell et al.: "Steroids," volume 1, pages 317 to 324, March 1963.

LEWIS GOTTS, *Primary Examiner.*

ELBERT L. ROBERTS, *Examiner.*

HENRY A. FRENCH, *Assistant Examiner.*

UNITED STATES PATENT OFFICE
CERTIFICATE OF CORRECTION

Patent No. 3,318,928                                             May 9, 1967

Georg Anner et al.

It is hereby certified that error appears in the above numbered patent requiring correction and that the said Letters Patent should read as corrected below.

Column 3, line 67, for "pyridine water" read -- pyridine +water --; column 5, line 38, for "eoxides" read -- epoxides -- line 45, for "deired" read -- desired --; column 6, lines 14 and 15, strike out "bands, inter alia, at 2.83, 3.00 (4.52), 6.20, 6.31, mµ (ε=2500)." and insert instead -- absorption maxima at 222 mµ (ε=9200) and 282 mµ (ε=2500). --; line 16, for "alio" read -- alia --; column 6, line 31, for "7β" read -- 17β --; column 8, line 67, for "0.004" read -- 0.003 --.

Signed and sealed this 9th day of January 1968.

(SEAL)
Attest:

EDWARD M. FLETCHER, JR.                          EDWARD J. BRENNER
Attesting Officer                                    Commissioner of Patents